Sept. 16, 1969  J. MARTIN  3,466,722

ROLLS FOR GLASS DRAWING MACHINERY

Original Filed May 13, 1965

INVENTOR

JOHN MARTIN

BY *Kenyon Palmer Stewart & Estabrook*

ATTORNEYS

United States Patent Office 3,466,722
Patented Sept. 16, 1969

3,466,722
ROLS FOR GLASS DRAWING MACHINERY
John Martin, Monterrey, Nuevo Leon, Mexico, assignor to Fabricacion de Maquinas, Monterrey, Neuvo Leon, Mexico, a corporation of Mexico
Original application May 13, 1965, Ser. No. 455,426, now Patent No. 3,364,546, dated Jan. 23, 1968. Divided and this application Sept. 18, 1967, Ser. No. 677,818
Int. Cl. B21b 31/08
U.S. Cl. 29—123                                    3 Claims

ABSTRACT OF THE DISCLOSURE

A roller having an tubular core is surrounded by a plurality of metallic and asbestos annuli. By tensioning said core, the annuli are compressed between end plates on said core. Rotation of said annuli is prevented by key and slot means between said metallic annuli and said core.

---

This application is a division of application S.N. 455,426, now Patent No. 3,364,546, issued Jan 23, 1968.

This invention relates to rolls and more particularly to asbestos covered rolls of the order of ten feet in length for use in sheet glass drawing and vertical or horizontal annealing machinery.

Rolls of the type with which the present inveniton is concerned comprise steel cores on which are assembled a plurality of asbestos washers, the washers being highly compressed and held in their compressed condition on the steel core. There are a number of problems which exist in the industry in relation to manufacture of rolls of this type most of which are completely eliminated by utilizing the method of the present invention. The principal problem is that of achieving the desired degree of compression of the washers on the steel core or shaft without distorting the shaft out of its initially substantially straight condition. It should be noted that this problem is peculiar to rollers of the size length to diameter ratio and weight used in the glass drawing art, due to the high degree of precision of the working surface of the roll. Obviously, the same problem would not exist in the manufacture, for example, of rubber covered wringer rolls for washing machines and the like.

Another problem which exists in the manufacture of glass drawing rolls is the tendency of the asbestos washers when placed under compression to "barrel" radially outwardly of the core or shaft or wedge out from one side thereby increasing the tendency of the shaft to buckle during the assembly process.

Accordingly, it is the principal object of the present invention to provide steel core asbestos rolls for use in glass drawing apparatus wherein the desired degree of compression of the asbestos may be achieved without however causing transverse distortion of the core.

Other objects will be apparent from the following detailed description taken in conjunction with the attached sheet of drawings in which.

In general, the objects of the present invention are achieved by utilizing a method of assembly in which the shaft of core is stressed in tension simultaneously with the stressing of the asbestos washers in compression. It has been found that by utilizing these oppositely acting tensile and compressive stresses during the assembly process that highly accurate shaft alignment results are maintained.

Figure 1:
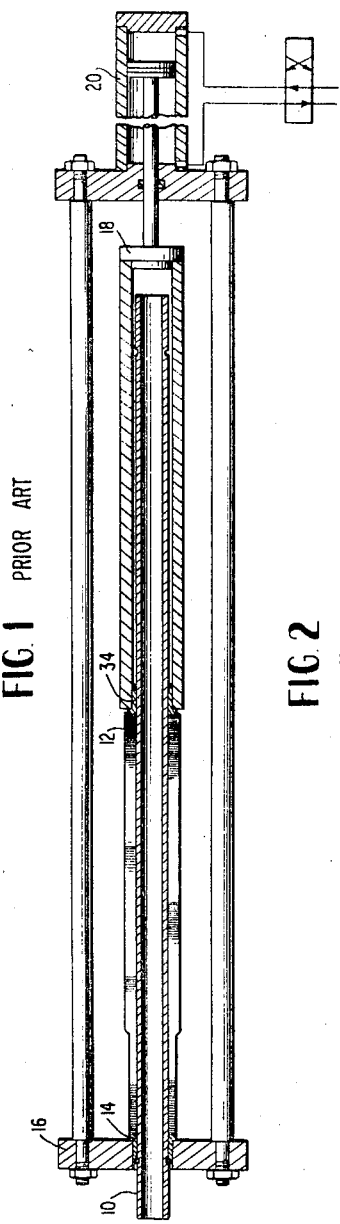
FIGURE 1 is a schematic illustration of the method of assembly of the prior art.

Referring now to FIGURE 1 which illustrates the prior art method of assembly, the shaft is shown at 10 and a plurality of annular asbestos washers 12 are positioned around the shaft 10. At the left hand end of the shaft as shown in FIGURE 1, there is positioned a stop means 14 against which the stack of asbestos washers abut.

As shown in this figure, it has been conventional in the prior art to compress the stack of asbestos washers 12 on the shaft 10 by hydraulic means. The stop member 14 is abutted against a member 16 which is fixed with respect to the movable head 18 of the press 20. It will be obvious that application of force to the head 18 by means of the press 20 will result in compression of the stack of washers 12 while the shaft 10 remains in its initially unstressed condition.

Due to the inherent characteristic of asbestos board the washers 12 tend under compressive loading to slip relative to one another and to "barrel" or wedge outwardly and radially of the shaft 10 at one or more locations. Such slippage and barreling results in the application of forces to the shaft 10 which are transverse to the axis thereof and which therefor bend the shaft out of its original straight alignment.

Figure 2:
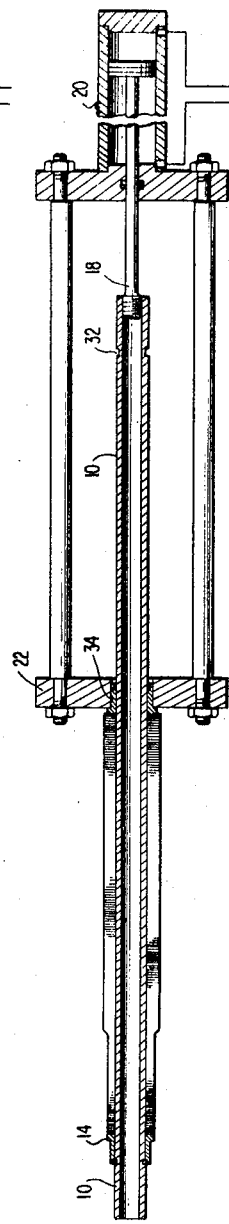
FIGURE 2 is a view similar to FIGURE 1 but showing the method for making a roller in accordance with the present invention.

In order to overcome the difficulty occasioned by the prior art method of manufacture, the method schematically illustrated in FIGURE 2 has been devised. As will be readily apparent from a consideration of the two figures, the direciton of application of force of the hydraulic press has been reversed. In order to take advantage of this force reversal, the abutment 16 has been replaced by an abutment 22 positioned to be engaged by the end of the stack of washers 12 remote from the stop means 14. This relatively simple rearrangement of parts permits a method of assembly in which the shaft 10 is loaded in tension simultaneously with the compression loading of the washers 12. It has been found that this arrangement and method results in an end product in which the shaft retains its original straight shape and yet the washers are nevertheless compressed to the required degree. Generally speaking, the degree of compression of the washers is such that their loose volume is cut substantially in half.

Figure 4:
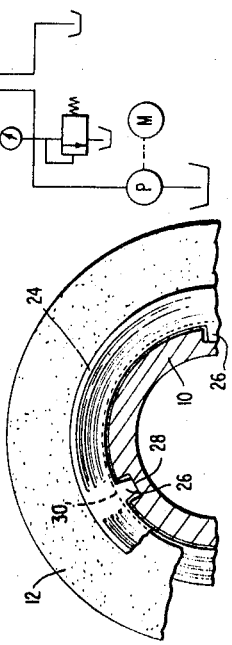
FIGURE 4 is a partial sectional view similar to FIGURE 3.
Figure 3:
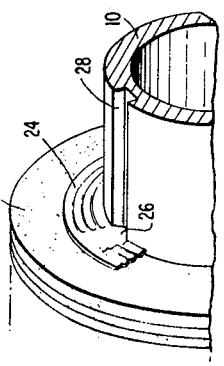
FIGURE 3 is a perspective view of a portion of an assembled roller showing the relationship between the core, the asbestos washers and the steel retaining washers.

Referring now to FIGURES 3 and 4, these show details of roll structure which are effective in producing a superior product in accordance with the teachings of this invention. As hereinbefore stated, when compressive forces are applied to a stack of asbestos washers, there is a tendency for the washers to move radially outwardly during compression due to the inherent physical properties of asbestos board. One way of minimizing such movement in the prior art has been to assemble a stack of washers on the shaft and then drive a plurality of fluted nails through the stack of washers parallel to the axis of the shaft. While this is apparently an effective expedient for achieving the desired result, it is obviously a time consuming one and requires considerable additional hand labor in the manufacturing process. In lieu of the nail driving procedure therefor the present invention contemplates the use of a series of corrugated steel washers shown generally at 24 in FIGURES 3 and 4. The preferred method of assembly is to make every third washer on the shaft a steel one such as 24. In this manner, every asbestos washer has one face in contact with one face of a corrugated steel washer. The corrugations once the compressive force has been applied will be pressed or coined into the surface of the asbestos and therefor prevent radial outward movement of the asbestos.

Since the finished roll when in use must exert a substantial torque on the sheet of glass being conveyed, it is necessary that a good driving torque connection be established between the shaft and the washers. The steel washers 24 provide for this torque transmission. As appears most clearly in FIGURE 4, the steel washers each include three radially inwardly directed lugs 26 for engagement with the bottom of three longitudinal grooves 28 machined into the surface of the shaft. Due to the fact that most hollow shafting is produced either by welding or centrifugal casting techniques, they are never perfectly round. In order therefore, to produce surfaces which are equidistant from the axis of rotation of the finished roll, the roll core is supported at its ends in bearings and then the grooves 28 are accurately machined throughout the length of the core, 120° apart. The base of the grooves, therefor, are equidistant from the axis of rotation of the finished roll. In this way, the lugs 26 of the steel washers abut the bottom of the grooves and this centers the washers with respect to the axis of rotation of the roll.

The inside diameter of the asbestos washers is shown in dotted line in FIGURE 4 at 30 and it will be seen that this is substantially larger than the outside diameter of the shaft 10. A good torque transmission between the shaft and the asbestos washers is achieved by the corrugation of the steel washer. These corrugations are interrupted on several radii of each washer thus forming shoulders which are effective to transmit torque from the shaft to the asbestos washers.

As indicated in FIGURE 2, the entire length of the shaft 10 is not filled with loose asbestos and steel washers prior to exerting the compressional force on the washers and tensional force on the shaft. Since the washers will be compressed to approximately one-half of their original volume, the rolls are preferably made by assembling the washers a few at a time on the shaft, compressing these, relieving the compressional force and quickly adding additional washers and repeating this process until the desired length of shaft has been covered with washers compressed to the desired degree. In order to secure the finally compressed stack on the shaft, use may be made of the conventional split-ring technique. The degree of compression is increased beyond that ultimately desired in order that a split ring may be placed in the annular groove 32. The hydraulic force is then relieved and the stop member 34 is allowed to abut and partially surround the split ring. It should be noted that there are two forces which tend to hold the parts in assembled relation, one of these is the tensile forces in the shaft 10 and the other is compressional forces in the stack of washers.

From the foregoing, it is believed that those skilled in the art will readily appreciate that there is herein disclosed a new and useful roller for the glass making art.

I claim:
1. A roll useful for drawing and/or annealing sheet glass comprising:
 (1) an elongated hollow metallic core having at least two circumferentially spaced parallel grooves extending the length of said core;
 (2) a plurality of annular washers formed of asbestos board surrounding said core;
 (3) a plurality of annular metallic radially corrugated washers having inwardly extending lugs engaging the bottom of said grooves, also surrounding said core and one metallic washer being placed between every other asbestos washer;
 (4) and means positioned at opposite ends of said core holding said washers in highly compressed condition.

2. A roll as defined by claim 1 in which said core is stressed in tension and the tensile stress is maintained by said last-mentioned means.

3. A roll as defined by claim 1 in which the radial corrugations of said metallic washers are interrupted at at least two locations along different radii of said washers.

References Cited

UNITED STATES PATENTS

| | | | |
|---|---|---|---|
| 355,026 | 12/1886 | Perkins | 29—125 X |
| 975,686 | 11/1910 | Granger | 29—123 |
| 1,540,588 | 6/1925 | Alexander | 29—123 |
| 1,930,999 | 10/1933 | Gaskell | 29—123 |
| 1,569,536 | 1/1926 | Crysler | 29—123 X |
| 1,628,835 | 5/1927 | Furbush | 29—125 |
| 2,085,575 | 6/1937 | Desbordes et al. | 29—125 X |
| 2,324,050 | 7/1943 | Shelley | 29—125 |
| 2,522,092 | 9/1950 | Churchill | 15—230.14 |
| 2,720,692 | 10/1955 | Lorig | 29—148.4 |
| 2,728,978 | 1/1956 | Birkenmaier et al. | 29—452 |
| 2,871,554 | 2/1959 | Siegfried | 29—452 X |
| 3,054,163 | 9/1962 | Lakin | 29—123 |
| 3,088,189 | 5/1963 | Johnston | 29—125 |
| 3,137,914 | 6/1964 | Lakin | 29—148.4 |
| 3,364,546 | 1/1968 | Martin | 29—125 |

ROBERT W. MICHELL, Primary Examiner

L. G. MACHLIN, Assistant Examiner